US009709401B2

United States Patent
Fell (10) Patent No.: US 9,709,401 B2
(45) Date of Patent: Jul. 18, 2017

(54) MEMS SENSORS

(71) Applicant: Atlantic Inertial Systems Limited, Plymouth (DE)

(72) Inventor: Chris Fell, Dublin (IE)

(73) Assignee: Atlantic Inertial Systems Limited, Devon Plymouth (GB)

( * ) Notice: Subject to any disclaimer, the term of this patent is extended or adjusted under 35 U.S.C. 154(b) by 208 days.

(21) Appl. No.: 14/266,323

(22) Filed: Apr. 30, 2014

(65) Prior Publication Data
US 2014/0331769 A1 Nov. 13, 2014

(30) Foreign Application Priority Data

Apr. 30, 2013 (GB) .................................. 1307773.0

(51) Int. Cl.
| | |
|---|---|
| G01C 19/00 | (2013.01) |
| G01P 3/44 | (2006.01) |
| G01P 9/00 | (2012.01) |
| G01P 15/08 | (2006.01) |
| G01C 19/5719 | (2012.01) |
| G01C 19/5684 | (2012.01) |
| G01C 19/5769 | (2012.01) |

(52) U.S. Cl.
CPC ..... *G01C 19/5719* (2013.01); *G01C 19/5684* (2013.01); *G01C 19/5769* (2013.01); *Y10T 29/49124* (2015.01)

(58) Field of Classification Search
CPC ............ G01C 19/5684; G01C 19/5769; G01C 19/5719; G01P 1/006; G01P 15/14
USPC .............. 73/504.12, 504.01, 504.04, 504.15, 73/504.29, 861.354, 493, 866.5
See application file for complete search history.

(56) References Cited

U.S. PATENT DOCUMENTS

| | | | |
|---|---|---|---|
| 5,932,804 A | 8/1999 | Hopkin et al. | |
| 6,282,958 B1 | 9/2001 | Fell et al. | |
| | (Continued) | | |

FOREIGN PATENT DOCUMENTS

| | | |
|---|---|---|
| EP | 2051297 A2 | 4/2009 |
| GB | 2322196 A | 8/1998 |
| | (Continued) | |

OTHER PUBLICATIONS

Extended European Search Report for European Patent Application No. 14166209.8, dated Sep. 1, 2014, 14 pages.

(Continued)

*Primary Examiner* — Lisa Caputo
*Assistant Examiner* — Roger Hernandez-Prewit
(74) *Attorney, Agent, or Firm* — Kinney & Lange, P.A.

(57) ABSTRACT

A MEMS sensor comprises a vibrating sensing structure formed from a semiconductor substrate layer (50). The semiconductor substrate layer (50) is mounted on a pedestal comprising an electrically insulating substrate layer (52) bonded to the semiconductor substrate (50) to form a rectangular sensor chip. The pedestal further comprises an electrically insulating spacer layer (54) for mounting the sensor chip to a housing. The electrically insulating spacer layer (54) is octagonal. When the vibrating sensing structure is excited into a cos 2θ vibration mode pair, the quadrature bias arising from any mode frequency split is not affected by changes in temperature as a result of the octagonal spacer layer (54).

12 Claims, 8 Drawing Sheets

(56) References Cited

U.S. PATENT DOCUMENTS

| | | | |
|---|---|---|---|
| 6,500,696 B2 | 12/2002 | Sutherland | |
| 7,781,240 B2 | 8/2010 | Badehi | |
| 2006/0150740 A1* | 7/2006 | Kurtz | G01L 9/0016 73/702 |
| 2006/0278956 A1 | 12/2006 | Cadouri | |
| 2008/0150087 A1 | 6/2008 | Farooq et al. | |
| 2008/0220220 A1 | 9/2008 | Wang et al. | |
| 2010/0270629 A1* | 10/2010 | Tokuda et al. | G01L 9/0042 257/415 |
| 2011/0296913 A1* | 12/2011 | Ohms | G01C 19/5755 73/504.12 |
| 2012/0025337 A1 | 2/2012 | Leclair et al. | |
| 2012/0025667 A1 | 2/2012 | Horikiri et al. | |

FOREIGN PATENT DOCUMENTS

| | | | |
|---|---|---|---|
| JP | 2000346648 A | 12/2000 | |
| WO | 2006124303 A1 | 11/2006 | |
| WO | 2010007406 A2 | 1/2010 | |

OTHER PUBLICATIONS

United Kingdom Search Report for United Kingdom Patent Application No. GB1307773.0, dated Oct. 29, 2013, 3 pages.

\* cited by examiner

FIGURE 1

PRIOR ART

Figure 2

PRIOR ART

Figure 3

PRIOR ART

MEMS SENSORS

CROSS-REFERENCE TO RELATED APPLICATION(S)

This application claims priority from United Kingdom Patent Application No. 1307773.0, filed Apr. 30, 2013, entitled MEMS SENSORS, which is incorporated by reference.

TECHNICAL FIELD

The present disclosure relates to micro electro mechanical systems (MEMS) sensors such as vibrating structure gyroscopes and to associated methods of manufacturing MEMS sensors. The MEMS sensor may comprise a sensing structure formed from a semiconductor e.g. silicon substrate.

BACKGROUND

Vibrating structure gyroscopes provide one example of a micro electro mechanical systems (MEMS) sensor device formed from a semiconductor e.g. silicon substrate. They can be batch fabricated from silicon wafers using conventional micromachining techniques. There is considerable interest in utilising MEMS gyroscopes in a range of guidance, navigation and platform stabilisation applications due to their low cost, small size and inherently robust nature. However, the limited performance capability of MEMS devices limits their wide-scale deployment in these areas. One performance limiting feature is that of rate bias stability e.g. resulting from variations in temperature during operation of the device.

Some examples of vibrating structure gyroscopes may be found in GB 2322196, U.S. Pat. Nos. 5,932,804 and 6,282,958. Each flexible support $4a$ to $4h$ includes a pair of compliant legs $8a$, $8b$ that are attached at one end to the external periphery of the annular resonator 2 and at the other end to the internal periphery of a support frame 10 defined by the substrate 6. The flexible supports $4a$ to $4h$ allow the annular resonator 2 to vibrate in response to electromagnetic drive transducers (not shown) constituted by metal track sections on two of the supports. Primary and secondary pairs of inductive pick-off transducers (not shown) are constituted by metal track sections on other of the supports. Such a vibrating structure gyroscope may have the annular resonator made of silicon and be particularly suited for fabrication using micromachining techniques.

In a typical vibrating structure gyroscope, the annular resonator is typically excited into a cos 2θ resonance mode. For a perfectly symmetrical resonator, this mode actually exists as a degenerate pair of primary and secondary vibration modes at a mutual angle of 45°. The primary mode is excited as the carrier mode. When the annular resonator is rotated about an axis normal to its plane, the Coriolis effect causes a secondary vibration in an orthogonal direction that couples energy into the secondary response mode. The amplitude of motion of the secondary response mode is proportional to the applied angular velocity.

In such devices, a quadrature bias may arise due to an imperfect matching of the primary and secondary frequencies in the cos 2θ resonance mode, which are ideally set to be equal. The magnitude of the quadrature bias is proportional to $\Delta F \cdot \sin 4\alpha$, where $\Delta F$ is the mode frequency split and $\alpha$ is the mode angular alignment with respect to the primary drive axis. Conventionally the quadrature bias is minimised during production using a laser trimming process which sets $\Delta F$ approximately equal to 0 Hz at room temperature. However, the Applicant has recognised that stress and strain induced due to the thermal expansion coefficient mismatches between various materials used in construction of a gyroscope can cause the $\Delta F$ value, and hence the quadrature bias, to change over the operating temperature range of the device.

Figure 2:
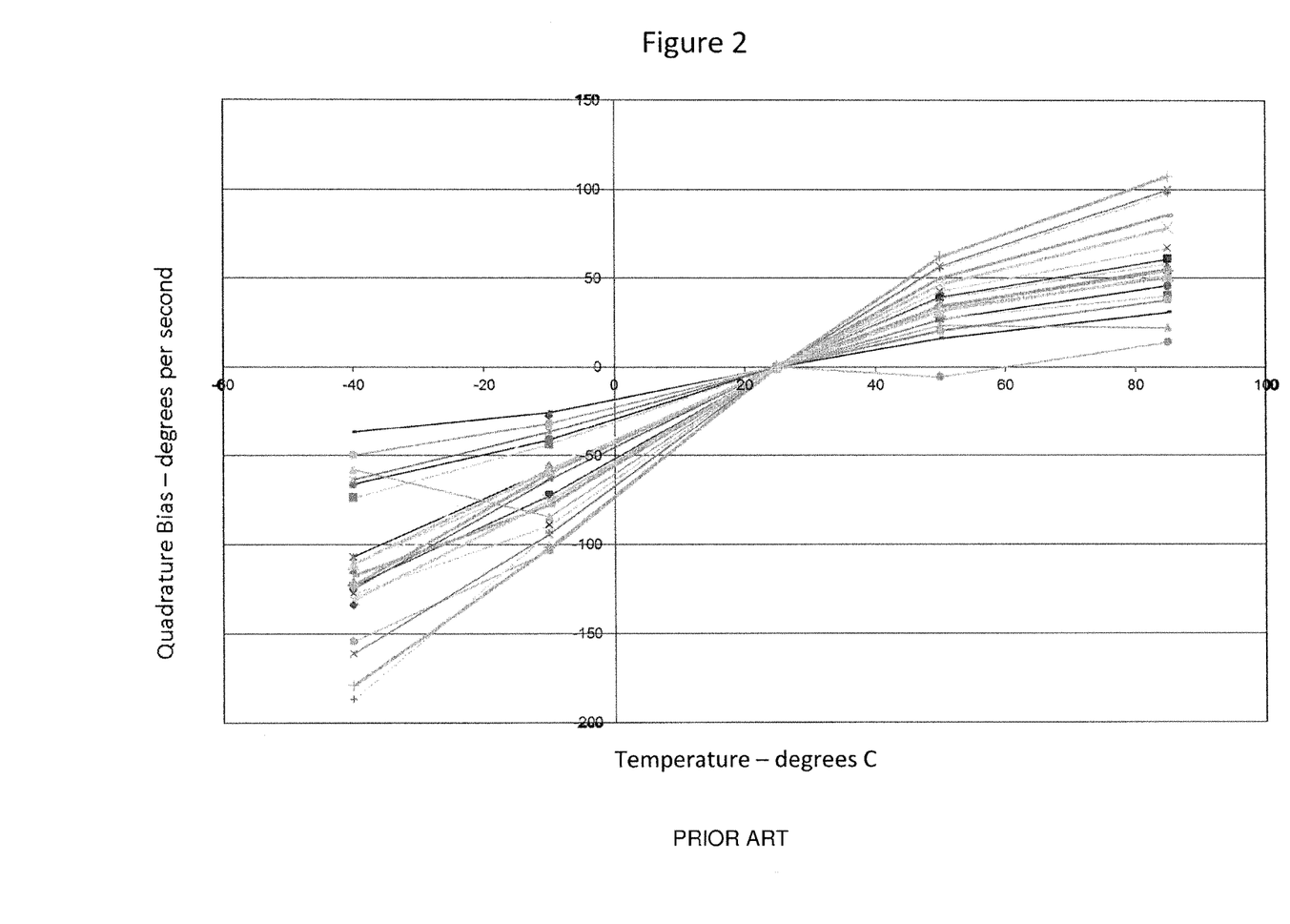
FIG. 2 shows the quadrature bias variation with temperature for a range of MEMS sensors of the type described in GB 2322196.

FIG. 2 shows typical data for the quadrature bias variation from an initial room temperature value for a range of sensors of the type described in GB 2322196. The average variation is around 150° per second over the −40 to +85° C. measurement range. This signal is in phase quadrature to the desired rate bias signal and is largely rejected by the control electronics. In practice, however, component tolerances in the electronics will introduce errors limiting the phase accuracy, thus allowing some of the quadrature bias to break through into the rate bias channel. Both the quadrature bias and phase error vary with temperature, giving rise to a variation in the rate bias. The instability of the rate bias in such conventional vibrating structure gyroscopes results in a performance that is unsatisfactory for many sensitive applications.

Figure 3:
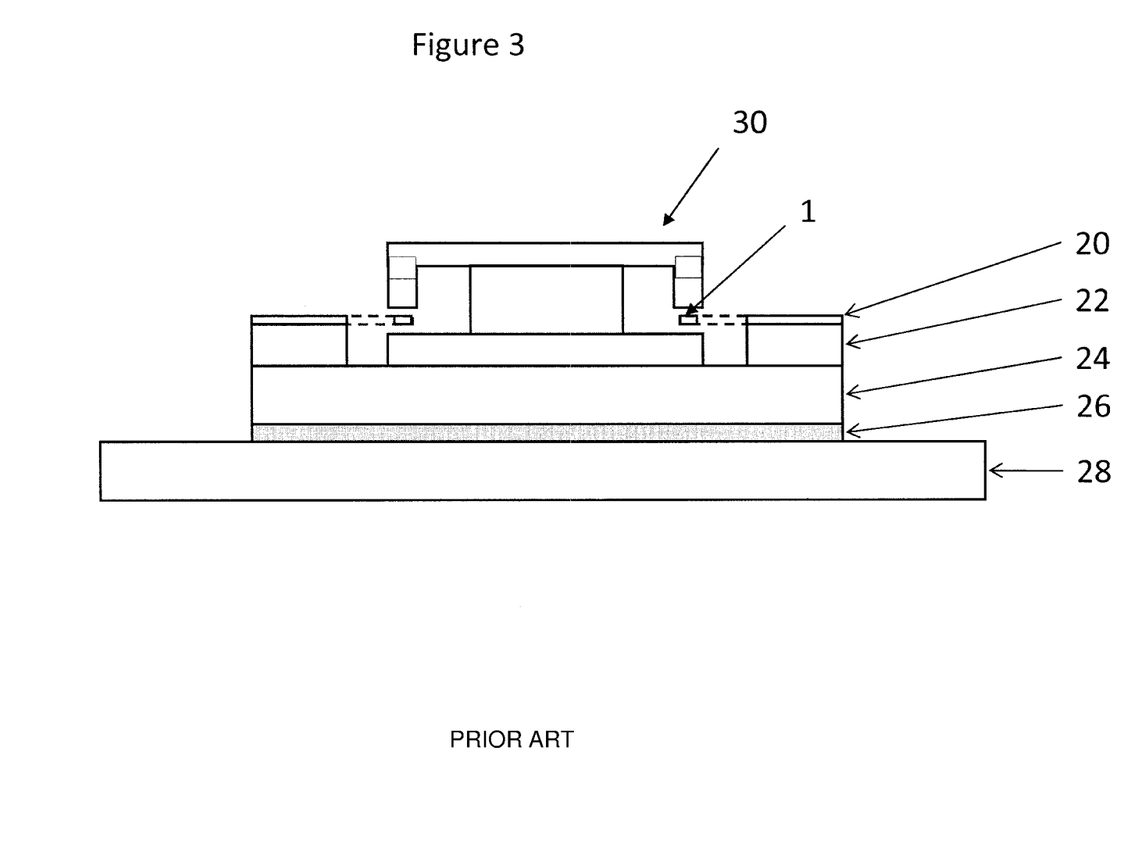
FIG. 3 provides a cross-sectional view of a prior art vibrating structure gyroscope as described in GB 2322196.

FIG. 3 shows a schematic cross-section of the sensor head structure of the vibrating structure gyroscope described in GB 2322196. An annular resonator 1 is seen to be supported spaced from a silicon substrate 20, while the silicon substrate layer 20 is mounted to a Pyrex glass pedestal layer 22 and a Pyrex glass spacer layer 24 to form a MEMS structure. The MEMS chip is attached by a die bond layer 26 e.g. of a silicone elastomer adhesive, to a rigid can package base 28. According to GB 2322196, the can package housing 28 is made from Kovar material i.e. a nickel-iron alloy. The different coefficients of thermal expansion for the various materials used in the construction of the MEMS device will induce stresses and strains that will vary with the ambient temperature of the device. For example, the coefficient of thermal expansion for silicon is 3.2 ppm per ° C. and the coefficient of thermal expansion for Pyrex is 3.25 ppm per ° C., whereas the coefficient of thermal expansion for nickel-iron alloy (e.g. NILO 45) is 7 ppm per ° C. Because the MEMS chip is square, it tends to resist the stress-induced deformation to a larger extent around the corner areas, which are more rigid due to their greater width. This can result in an asymmetric stress and strain distribution which has peaks and troughs which are angularly aligned with the corners and faces of the square chip. This variable stress and strain can be coupled into the annular resonator 1 through the legs $8a$, $8b$ of supports $4a$-$4h$. This effectively imparts a cos 4θ perturbation into the resonator 1 which can induce a frequency split $\Delta F$ between the cos 2θ modes which will vary with ambient temperature.

A significant source of asymmetric stress and strain arises due to the large thermal expansion mismatch between the package housing 28 and the MEMS device. The die bond layer 26 is intended to decouple the MEMS device from the stress and strain of the package housing 28. However, such a silicone elastomer adhesive material typically has a comparatively low Young's Modulus ($0.1 \times 10^9$ Pa) compared to that for the silicon layers ($190 \times 10^9$ Pa) and Pyrex layers ($62.7 \times 10^9$ Pa), but has a very high thermal expansion coefficient (500 ppm per ° C.) as compared to 3.2 ppm per ° C. for silicon and 3.25 ppm per ° C. for Pyrex. The net result is that significant stress and strain can be imparted to the MEMS structure from the elastomer die bond layer 26 and this may introduce a significant asymmetry with a cos 4θ periodicity. The square chip structure acts to focus this asymmetry so that thermally-induced stress and strain splits the frequencies of the cos 2θ mode pair.

The present disclosure seeks to address at least some of the issues outlined above.

SUMMARY

There is disclosed herein a MEMS sensor comprising: a vibrating sensing structure formed from a semiconductor substrate layer, the semiconductor substrate layer being mounted on a pedestal comprising an electrically insulating substrate layer bonded to the semiconductor substrate to form a rectangular sensor chip; and the pedestal further comprising at least one electrically insulating spacer layer for mounting the sensor chip to a housing, wherein the electrically insulating spacer layer is octagonal.

The MEMS sensor may comprise any kind of vibrating sensing structure that can be operated using a cos 2θ vibration mode pair. The MEMS sensor may further comprise a drive transducer arranged to cause the vibrating sensing structure to vibrate in a primary in-plane resonance mode that is a cos 2θ resonance mode. In one set of examples the MEMS sensor may be a vibrating structure gyroscope comprising a vibrating ring sensing structure. In another set of examples the MEMS sensor may be a resonant mass sensor detector comprising a circular disc resonator. Such a mass detector may measure the frequency split produced in the cos 2θ vibration modes resulting from thermally-induced stress or strain variations. This can affect the detector's sensitivity in applications such as medical diagnostics and drug discovery.

In one example the octagonal spacer layer may have been formed by dicing through all of the layers together, as a result of voids present at at least some junctions of the x and y cutting lines, as is described above. Alternatively the octagonal spacer layer may have been formed separately, and then mounted to the rectangular sensor chip, e.g. after it had been diced, so as to form the pedestal.

In such a MEMS sensor the spacer layer ensures that any die bond fixing to the housing is octagonal. This means that the way any thermally-induced stress or strain is coupled to the sensor is controlled by the octagonal geometry of the spacer layer. The spacer layer may be thicker than the electrically insulating substrate layer bonded to the semiconductor substrate, and even thicker than the entire rectangular sensor chip. The spacer layer can be the thickest part of the MEMS sensor. Making the spacer layer octagonal can significantly reduce the effective stiffness along the diagonals, making it more similar to that along the principal x and y axes. The residual cos 4θ asymmetry in the stiffness arising from the rectangular sensor chip may be compensated by adjusted the geometry of the octagonal spacer layer e.g. to give a resultant in-plane stiffness that is equal along the principal axes and diagonal axes.

For example, octagonal spacer layer may have an irregular octagonal shape.

In one example the MEMS sensor is a vibrating structure gyroscope, e.g. as is described in more detail below. In this example the sensing structure may comprise a substantially planar annular resonator and a plurality of flexible support members arranged to support the annular resonator spaced from the semiconductor substrate and to allow the annular resonator to oscillate in one or more in-plane resonance modes. The semiconductor substrate and annular resonator may be made of silicon. There may be provided a drive transducer causing the annular resonator to vibrate in the cos 2θ resonance mode. There may be provided a sensing transducer to detect oscillation of the annular resonator.

In any example relating to a vibrating structure gyroscope, the flexible support members may provide elastic suspension with two orthogonal degrees of freedom e.g. allowing the primary and secondary modes of oscillation. The flexible support members may comprise eight pairs of compliant legs equiangularly spaced about the annular resonator in a manner as disclosed by WO 2010/007406, the content of which is herein incorporated by reference.

In any example relating to a vibrating structure gyroscope, the drive transducer can use any suitable drive means, for example electromagnetic, optical, thermal expansion, piezoelectric or electrostatic effects. The sensing transducer can use any suitable means, for example capacitive sensing or electromagnetic sensing. However in one set of examples the sensing transducer comprises at least one inductive pick-off transducer e.g. constituted by conductive track(s) on the annular resonator and on the support members. An inductive pick-off transducer may be preferred over a capacitive transducer pair as the support members can be made more symmetrical when each carries a conductive e.g. metal track.

As is conventional, in any example relating to a vibrating structure gyroscope, the device may further comprise means for generating a magnetic field substantially perpendicular to the plane of the annular resonator. In particular, a ring pole magnetic assembly comprising a permanent magnet located inside the circumference of the annular resonator for concentrating the magnetic field on the resonator, with the annular resonator located in a gap between upper and lower poles of the assembly.

There is further disclosed herein a vibrating structure gyroscope comprising: a semiconductor substrate, a substantially planar annular resonator, and a plurality of flexible support members arranged to support the annular resonator spaced from the semiconductor substrate and to allow the annular resonator to oscillate in one or more in-plane resonance modes; a drive transducer causing the annular resonator to vibrate in a primary in-plane resonance mode that is a cos 2θ resonance mode; and a sensing transducer to detect oscillation of the annular resonator resulting from an orthogonal secondary in-plane resonance mode generated in response to an angular velocity applied around an axis substantially perpendicular to the plane of the annular resonator; wherein the semiconductor substrate layer is mounted to at least one electrically insulating substrate layer and one or more of the substrate layers is octagonal.

It will be appreciated that the substrate layers used to form a MEMS device such as a vibrating structure gyroscope are usually rectangular in structure as this is the natural shape produced by a dicing process as is most frequently used to cut a sensor die from the wafers e.g. of silicon and/or glass on which the device is fabricated. An octagonal substrate layer therefore represents an unexpected deviation from the norm. The Applicant has recognised that the most detrimental asymmetric stress effects are those which have a maximum differential effect on the cos 2θ resonance mode pair. This occurs when the maximum radial stress coincides with the radial anti-node of one mode, with the minimum coinciding with the radial anti-node of the second mode, i.e. a 45° periodicity. A conventional square substrate structure imparts exactly this 45° periodicity of stress asymmetry and therefore augments a cos 4θ perturbation in the vibration of the annular resonator. In many ways, a square substrate geometry is the most incompatible with the cos 2θ resonance modes utilised with an annular resonator. By forming at least one of the substrate layers so as to be octagonal, any cos 4θ asymmetry can be reduced and even removed.

By providing an octagonal substrate layer the primary and secondary cos 2θ resonance mode frequencies may be set to be equal, or at least the mode frequency split ΔF may be kept substantially constant. For an octagonal structure the dominant radial stress asymmetry has a cos 8θ radial variation, which will therefore have an equal number of maxima and minima for each of the cos 2θ mode pair and thus no differential stress effects will be induced. The quadrature bias of the vibrating structure gyroscope may therefore be decoupled from changes in temperature that would otherwise cause stress and strain asymmetries disturbing the matching of the primary and secondary cos 2θ resonance modes. Reducing the variation of the quadrature bias over temperature is highly desirable as this enables the accuracy of the quadrature bias trimming performed at room temperature to be maintained to a higher degree of accuracy over the operating range of the gyroscope. This in turn gives an improvement in the rate bias performance of the device.

The octagonal substrate layer may be symmetric (e.g. with sides of equal length) or asymmetric (e.g. with sides of non-equal length). Some or all of the substrate layers may have the same octagonal shape. The MEMS vibrating structure gyroscope may therefore be made from a octagonal sensor die.

The semiconductor substrate layer may be mounted to one or more electrically insulating substrate layers to form a MEMS structure which can then be suitably housed or packaged. For example, at least one electrically insulating substrate layer may be mounted to a package base such as a metal can. The package base for the housing may be made of a magnetic material, for example a nickel-iron alloy or similar. As is mentioned above, an effect of one or more of the substrate layers being octagonal is to avoid an asymmetric stress and strain distribution that would otherwise result from the different coefficients of thermal expansion of the packaging material as compared to the substrate layers.

The electrically insulating substrate layer(s) may be made of any suitable electrical insulating material, e.g. comprising a ceramic layer. In one example the semiconductor substrate layer is mounted to at least one electrically insulating substrate layer comprising a glass layer. The semiconductor substrate layer may be bonded to the glass layer(s). This can provide hermetic sealing of the semiconductor e.g. silicon substrate layer so that it is protected from environmental influences.

In a conventional micromachining technique, usually a semiconductor e.g. silicon wafer is etched to form the annular resonator, then turned upside down and bonded (e.g. using electrostatic or anodic bonding) to a glass substrate layer provided by another wafer. The silicon and glass substrate layers may then be cut to form individual MEMS sensor dies. Ideally the coefficient of thermal expansion of the glass substrate layer is similar to that of the semiconductor e.g. silicon layer, for example a borosilicate glass such as Pyrex may be used for the glass layer(s).

Figure 4:
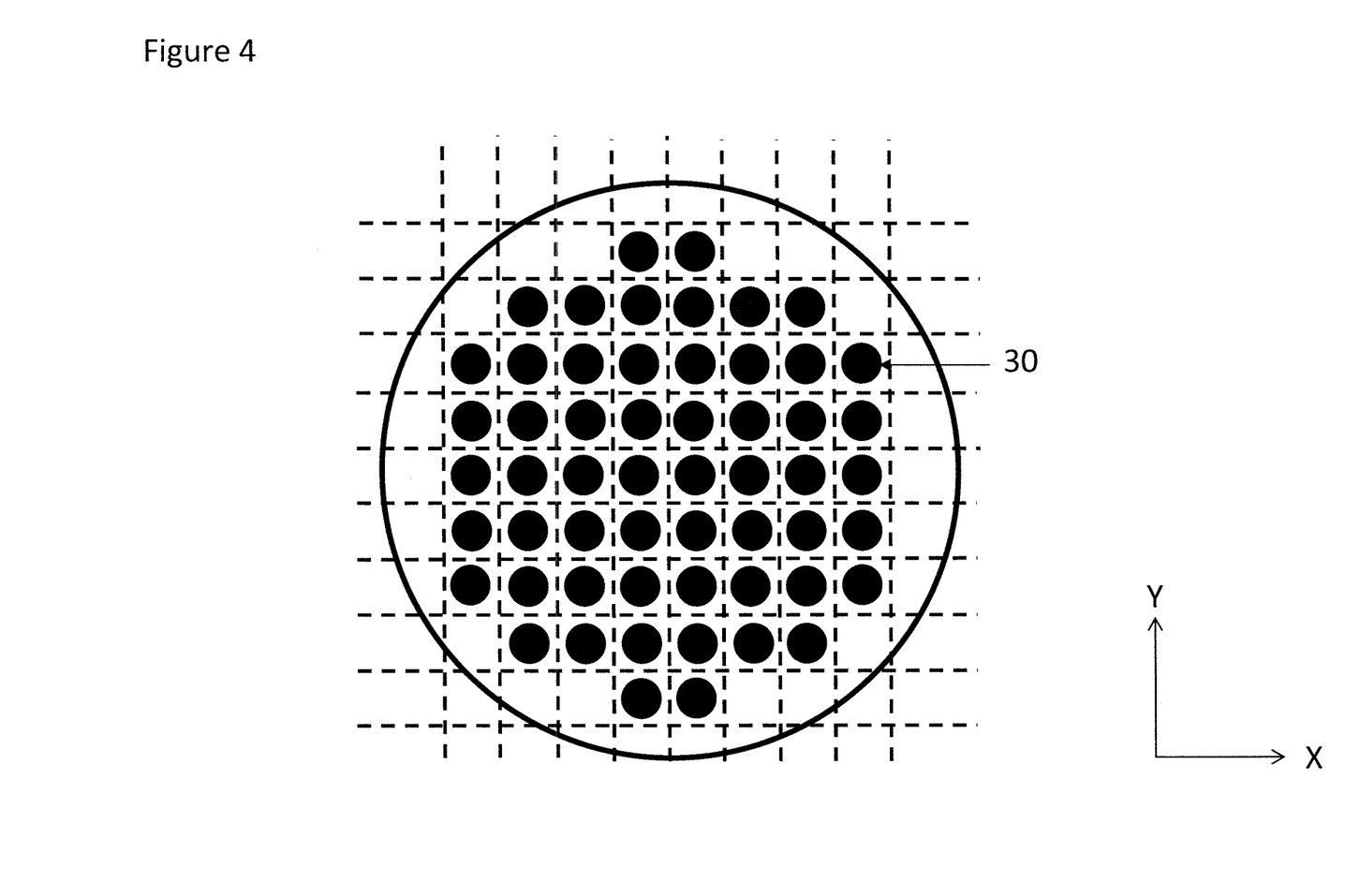
FIG. 4 shows a conventional wafer dicing scheme.

Conventional dicing (along x and y axes) produces rectangular sensor dies, as is shown by FIG. 4. For the devices described by GB 2322196, 56 dies can be produced from a 4 inch (10 cm) wafer. It is seen from FIG. 3 that each die includes a magnetic assembly 30 (a permanent magnet sandwiched between upper and lower poles) mounted on the silicon substrate 20 inside the annular resonator 1. In FIG. 4 the dark circles illustrate the positions of these magnetic assemblies. A dicing blade passing along the x and y axes does not come into contact with the metallic structures forming the magnetic assemblies and is therefore able to cut cleanly through the silicon and glass layers without being damaged.

In one example at least the semiconductor e.g. silicon substrate layer is diced so as to be octagonal. Any electrically insulating (e.g. glass) substrate layers mounted to the semiconductor e.g. silicon substrate layer may be diced so as to have the same octagonal form. It is convenient for the substrate layers to be mounted e.g. bonded together and then diced together into individual MEMS sensor dies.

One dicing method comprises additionally cutting the substrate layer(s) at an angle to the x and y axes, e.g. applying extra diagonal cuts to make the octagonal dies. However it will be appreciated that cutting at an angle away from the x and y axes risks the dicing blade coming into contact with the magnetic structures of the MEMS devices. This may be avoided by alternately spacing the sensor assemblies across the substrate layers so that a dicing blade has uninhibited access to cut the octagonal sensor dies. Omitting the sensor structures from half of the locations on a wafer inevitably reduces the number of MEMS devices that can be produced e.g. only 28 instead of 56.

An alternative method comprises forming voids in the substrate layer(s) at at least some junctions of the x and y axes before cutting the substrate layer(s) along the x and y axes. The voids effectively form additional sides of each die so that an octagonal sensor die results. An advantage is that all of the sensor locations on a wafer can be populated with magnetic assemblies without interfering with the dicing blade. The voids may be fabricated in each substrate layer using conventional techniques, such as a Deep Reactive Ion Etching (DRIE) process for a semiconductor substrate layer or a glass machining technique for the electrically insulating substrate layer(s). However it then becomes necessary for the voids in each substrate layer to be formed at the same positions and for these voids to be aligned when the semiconductor substrate layer is mounted to the electrically insulating substrate layer(s).

In both cases, whenever octagonal sensor dies are formed there is required a re-design of some of the device features as compared to conventional rectangular sensor chips. For example, in the devices described in GB 2322196, metal bond pads are present in the corners of the rectangular chips for electrical connection of the MEMS sensor to package pins. Metal tracking and bond pad layout can be adjusted to avoid the corner areas if necessary. However alignment key features are also conventionally located in the corner areas and used to aid alignment not only of the various substrate layers but also for alignment when positioning the magnetic assembly on each rectangular chip. While such alignment keys may be re-located, this requires significant modification of standard production processes, which may be time-consuming and expensive to implement.

In a particularly convenient arrangement, at least the semiconductor (e.g. silicon) substrate layer is rectangular while at least one electrically insulating (e.g. glass) substrate layer has an octagonal form. This enables an octagonal geometry to be introduced into the MEMS sensor die whilst preserving the majority of the existing production processes, especially for the semiconductor (e.g. silicon) substrate layer that carries the sensor device features. It may be convenient for an electrically insulating (e.g. glass) substrate layer mounted directly to the semiconductor e.g. silicon substrate layer to also have the same rectangular form. These layers may therefore be diced together using conventional cuts along the x and y axes. In this example it is convenient for another electrically insulating (e.g. glass) substrate layer that is mounted indirectly to the semiconductor substrate layer to have an octagonal form. This other electrically insulating substrate layer may take the form of a spacer layer.

There is further disclosed herein a pedestal for a vibrating structure gyroscope of the type having a substantially planar annular resonator supported from a semiconductor substrate and driven to vibrate in a cos 2θ resonance mode, the pedestal comprising at least one electrically insulating substrate layer for mounting the semiconductor substrate layer, wherein the electrically insulating substrate layer is octagonal. As is described above, the semiconductor substrate layer may be rectangular and cut from a wafer using conventional dicing. The semiconductor substrate layer may be formed from silicon. The electrically insulating substrate layer may take the form of a ceramic or glass layer.

In one example the octagonal electrically insulating substrate layer may be directly mounted to the semiconductor substrate layer. In another example the octagonal electrically insulating substrate layer may be a spacer layer that indirectly mounts the semiconductor substrate layer. This means that the spacer layer can be cut to an octagonal shape without interfering with the MEMS sensor structures mounted on the semiconductor substrate layer. It is convenient for the spacer layer to be formed with voids before it is mounted to an electrically insulating substrate layer that is directly mounted to the semiconductor substrate layer. The assembled layers can then all be diced together by cutting along the x and y axes, so as to form rectangular dies in the upper layers and octagonal dies in the spacer layer due to the voids.

There is disclosed herein a method of making a MEMS sensor die e.g. for a vibrating structure gyroscope comprising: forming a vibrating sensing structure on a semiconductor substrate layer; mounting the semiconductor substrate layer to an electrically insulating substrate layer so that rectangular sensor dies can be defined by orthogonal x and y cutting lines in the plane of the substrate layers; mounting the electrically insulating substrate layer to a spacer layer that has voids formed at at least some junctions of the x and y cutting lines; and dicing the layers to form sensor dies comprising a rectangular sensor chip mounted on an octagonal spacer layer. The vibrating sensing structure may be a substantially planar annular resonator for a vibrating structure gyroscope, such as is described above.

The disclosed method preserves many of the benefits of an octagonal geometry without necessarily requiring sensor features, such as alignment keys or bond pad positions, which are mounted on the semiconductor substrate layer to be changed. By producing voids in only the lower spacer layer, while leaving the upper electrically insulating substrate (e.g. glass pedestal) layer and semiconductor (e.g. silicon) substrate layer intact, conventional assembly processes can be used without modification.

In one example, the method comprises the steps of: forming voids in the spacer layers at each junction of the x and y cutting lines; and dicing the layers along the x and y cutting lines to form sensor dies comprising a rectangular sensor chip mounted on the octagonal spacer layer.

The method may further comprise the steps of: selecting one of the sensor dies and bonding the spacer layer to a sensor package to form a packaged sensor.

The method may comprise bonding the semiconductor substrate layer to the electrically insulating substrate layer using electrostatic or anodic bonding. The method may comprise bonding the electrically insulating substrate layer to the spacer layer using an adhesive e.g. an epoxy adhesive.

It will be appreciated that the number and arrangement of the voids in the spacer layer can dictate the octagonal geometry achieved after dicing. The voids may be all the same size or different sizes, for example to make symmetric or asymmetric shapes. The voids in the a spacer layer may be formed by any suitable technique, for example conventional glass machining techniques such as ultrasonic machining, wet etching or powder blasting. Ultrasonic machining may be used as it is capable of producing voids of precise geometry with vertical side walls. On the other hand, wet etching or powder blasting typically produce voids with tapered side walls.

When using such a method to make a MEMS sensor die, each rectangular sensor chip can benefit from being mounted on an octagonal spacer layer. For example, the detrimental effects of thermally-induced stress being concentrated at the corners of a rectangular chip can be mitigated by an eight-fold symmetry in the spacer layer. Such benefits extend to any MEMS sensor device comprising a vibrating sensing structure where a purely rectangular e.g. square geometry might result in differential stress effects on a cos 2θ resonance mode.

Examples of a MEMS sensor in the form of a vibrating structure gyroscope will now be described with reference to the accompanying drawings.

DETAILED DESCRIPTION

Figure 1:
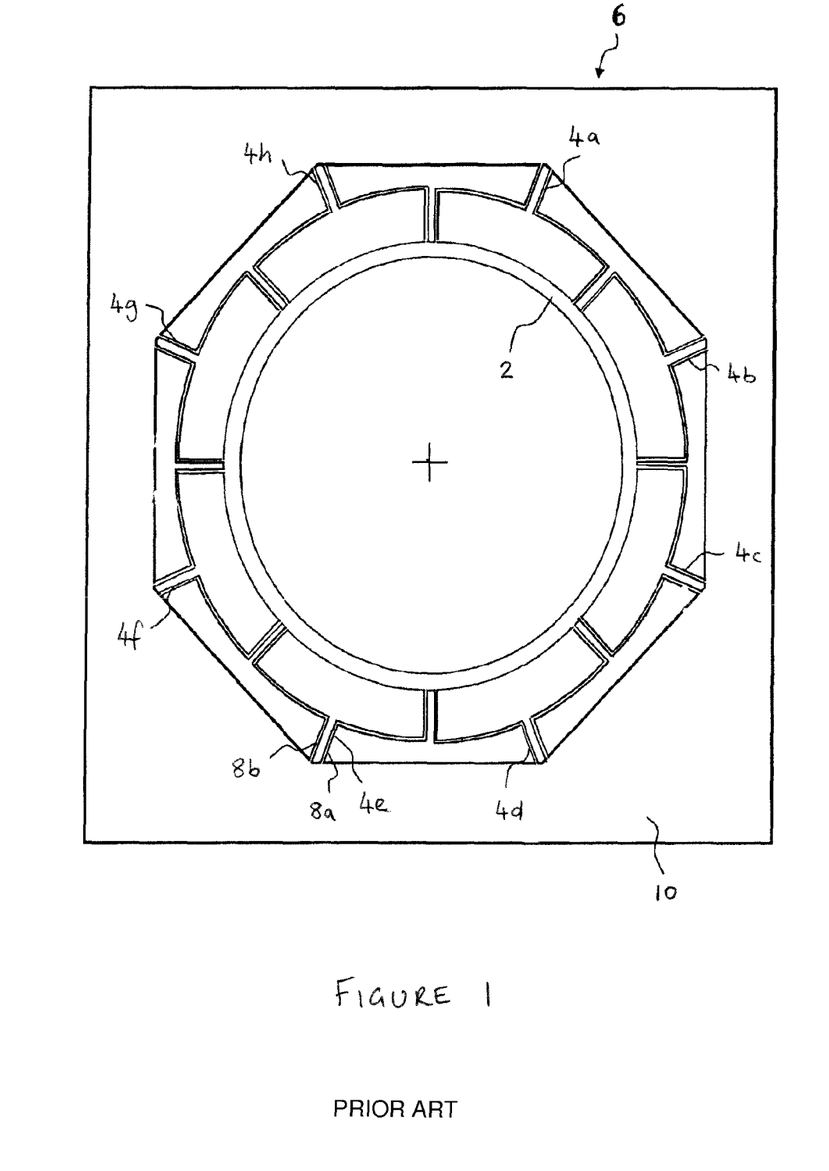
FIG. 1 shows a prior art arrangement of a MEMS sensor comprising an annular resonator.

FIG. 1 shows an example of a prior art vibrating structure gyroscope comprising an annular resonator 2 mounted by eight flexible supports 4a to 4h arranged to retain the annular resonator 1 within a semiconductor substrate 6. Each flexible support 4a to 4h includes a pair of compliant legs 8a, 8b that are attached at one end to the external periphery of the annular resonator 2 and at the other end to the internal periphery of a support frame 10 defined by the substrate 6. The flexible supports 4a to 4h allow the annular resonator 2 to vibrate in response to electromagnetic drive transducers (not shown) constituted by metal track sections on two of the supports. Primary and secondary pairs of inductive pick-off transducers (not shown) are constituted by metal track sections on other of the supports.

FIG. 2 shows typical data for the quadrature bias variation as a function of temperature (normalised to 25° C. value) for a range of sensors of the type shown in cross-section in FIG. 3 and described in GB 2322196. As is mentioned above, the average variation is around 150° per second over the −40 to +85° C. measurement range. It can be seen from FIG. 3 that a conventional vibrating structure gyroscope comprises a magnetic assembly 30 mounted inside an annular resonator 1 that is supported spaced from a silicon substrate 20. The silicon substrate layer 20 is mounted on a Pyrex glass pedestal layer 22 and a Pyrex glass spacer layer 24. While the silicon and Pyrex glass substrate layers 20, 22, 24 have substantially similar coefficients of thermal expansion, the Pyrex glass spacer layer 24 is bonded to the outer can package housing 28 by a layer 26 of silicone elastomer adhesive, with the material of the die bond layer 26 and package housing 28 having very different thermal expansion coefficients. The different coefficients of thermal expansion result in thermally-induced stresses and strains in the sensor device that vary with the ambient temperature. Furthermore, because the sensor chip formed by the substrate layers 20, 22, 24 is rectangular, there tends to be an asymmetric stress and strain distribution concentrated at the corners of the rectangular structure which imparts a cos 4θ perturbation into the annular resonator 1. It is seen from FIG. 2 that this results in a undesirably large variation in the quadrature bias across a range of operating temperatures.

Figure 5:
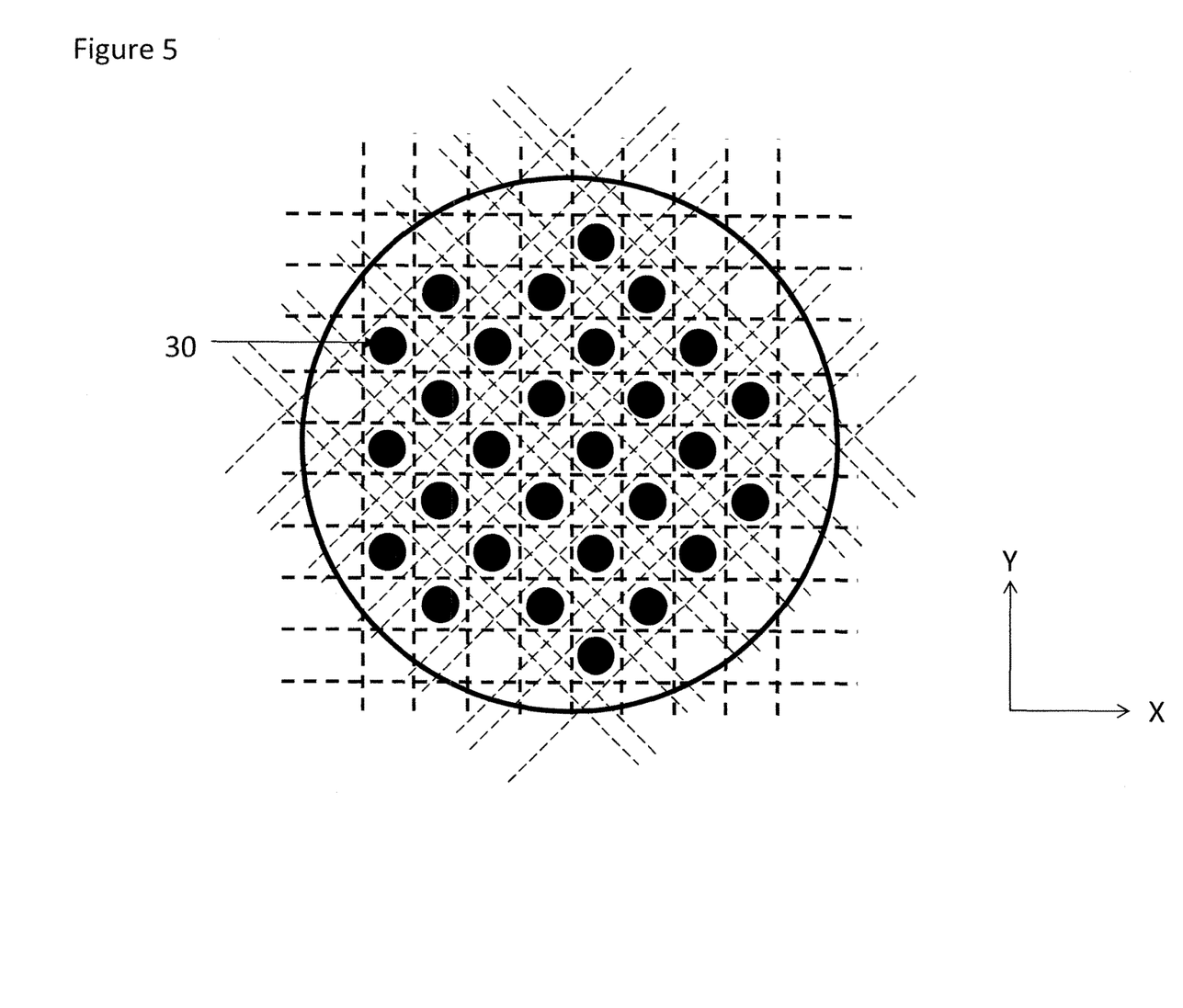
FIG. 5 shows a first wafer dicing scheme for making octagonal dies.

A rectangular sensor chip may be diced from a silicon and/or glass wafer using a conventional dicing scheme as is seen in FIG. 4. In order to make an octagonal sensor die, one or more silicon and/or glass substrate layers may be diced using additional diagonal cuts as is shown in FIG. 5. In these Figures the magnetic assembly 30 provided for each sensor die is shown as a black circle. It can be seen that the additional diagonal cuts in FIG. 5 are accommodated by alternately spacing the magnetic assemblies 30 so that half the number of dies are produced from a wafer of the same size e.g. as compared to FIG. 4.

Figure 6:
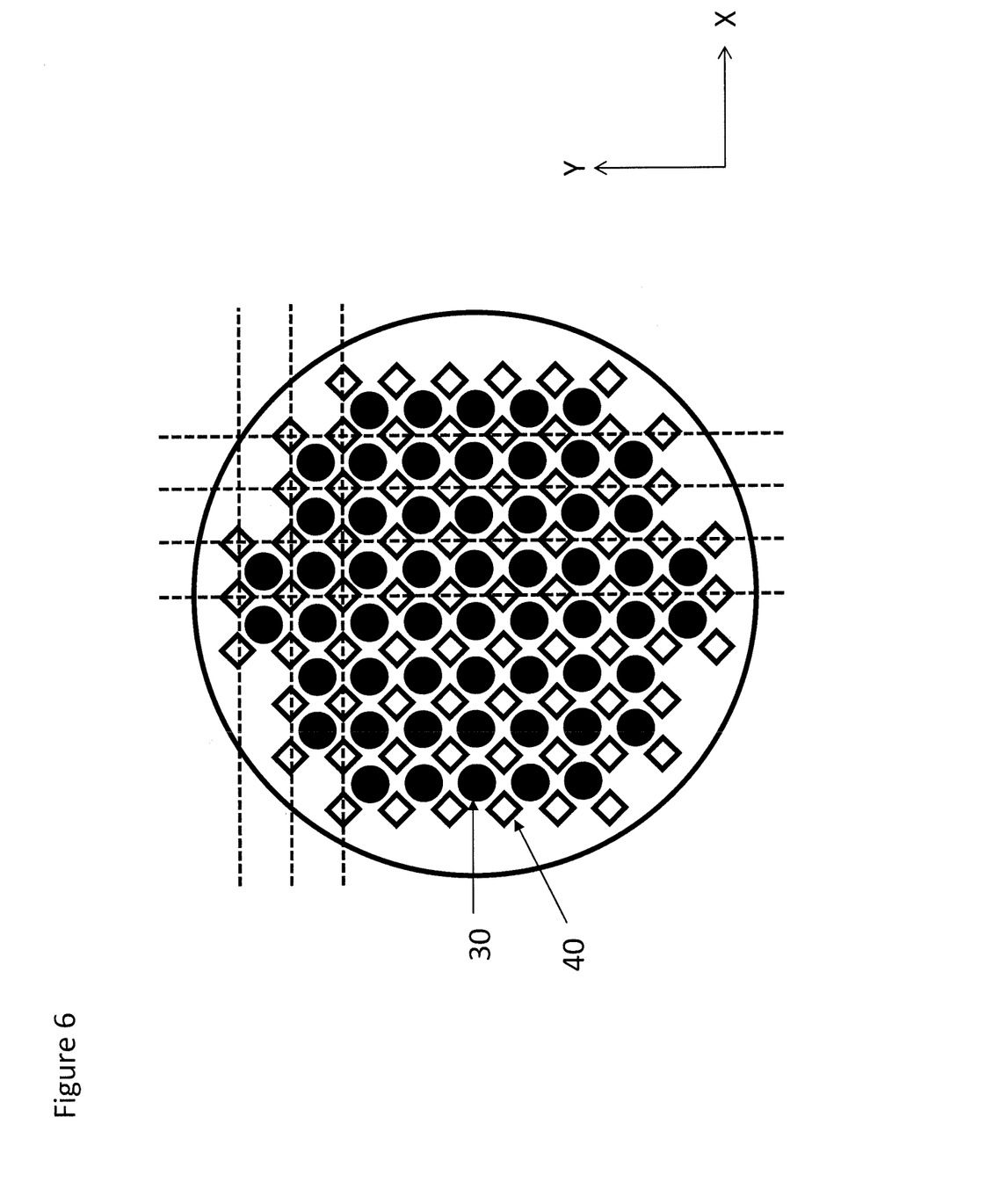
FIG. 6 shows a second wafer dicing scheme for making octagonal dies.

An alternative dicing scheme, seen in FIG. 6, provides one or more of the substrate layers with voids 40 at the corners of each rectangular die which are intersected by x and y cutting lines so as to produce sensor dies that are octagonal in shape. This means that conventional dicing techniques can be used without interfering with the magnetic assemblies 30. If the silicon substrate layer 20 is cut into octagonal dies then some re-design may be required, for example adjusting the metal tracking and bond pad layout as compared to the devices described in GB 2322196, and re-locating the alignment keys that would be present in the corner areas of a rectangular chip. However this can avoided by only forming the voids 40 in one of the lower substrate layers mounted underneath the silicon substrate layer 20, for example in the glass spacer layer 24 used to mount the sensor device to the housing 28. When the substrate layers are mounted together and subsequently diced along the x and y cutting lines, the upper silicon layer 20 and glass pedestal layer 22 are cut into rectangular dies, while the lower glass spacer layer 24 is cut into octagonal dies as a result of the voids 40 forming additional sides for each die.

Figure 7:
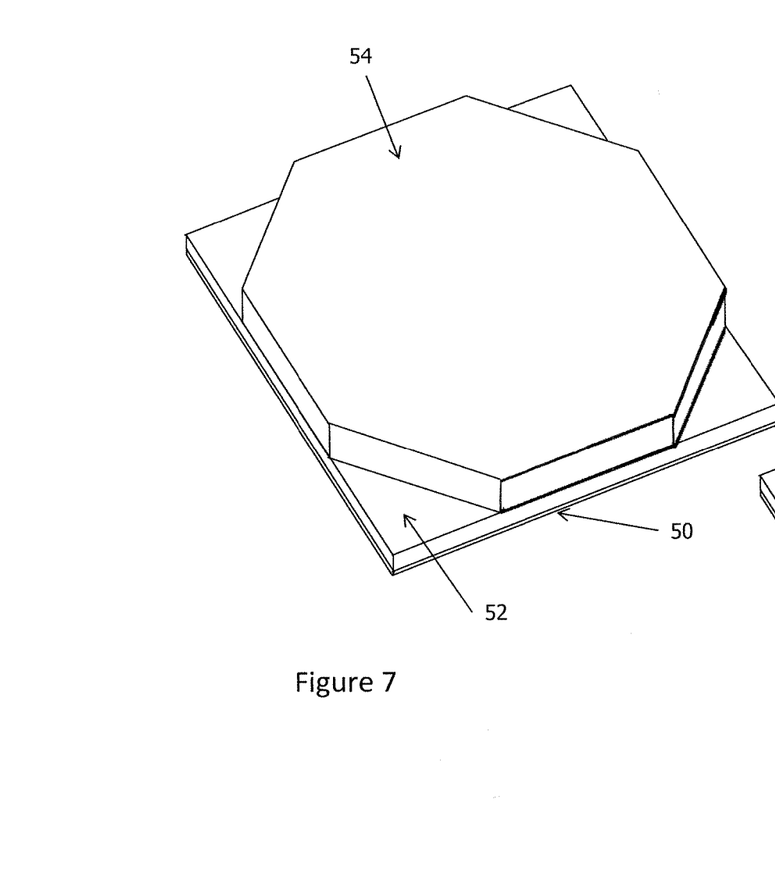
FIG. 7 is a schematic illustration of an exemplary sensor die.

An exemplary sensor die is shown in FIG. 7 to comprise a silicon substrate layer 50 (0.1 mm thick) mounted on a glass pedestal layer 52 (0.8 mm thick) that is itself mounted to a glass spacer layer 54 (1.5 mm thick). The silicon layer 50 and glass pedestal layer 52 have been cut together in a rectangular shape, while the glass spacer layer 54 has been cut to have a symmetric octagonal shape. This sensor die may then be bonded using conventional techniques to a can package base or other housing.

Figure 8:
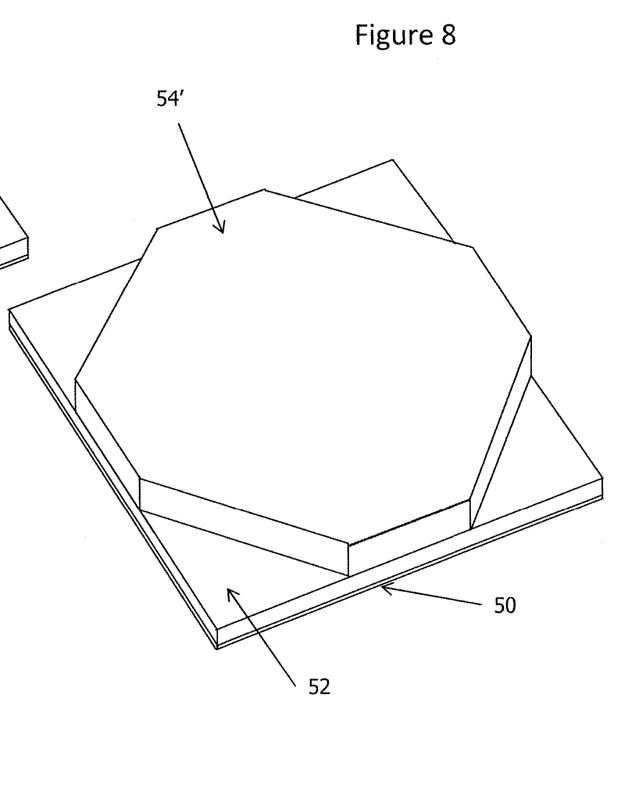
FIG. 8 is a schematic illustration of another exemplary sensor die.

Fig. 8 illustrate an alternative sensor die in which the glass spacer layer 54' has been cut so as to have an irregular octagonal shape.

Although not shown in FIGS. 7 and 8, to form a vibrating structure gyroscope an annular resonator and support members are fabricated from the 0.1 mm thick silicon wafer 50 using a deep reactive ion etch (DRIE) process. The etched silicon wafer is then bonded to the Pyrex glass pedestal wafer 52 using an anodic bonding process. This wafer pair is then in turn bonded, using an epoxy adhesive, to the Pyrex glass spacer layer 54. In order to produce an octagonal spacer layer 54 in each sensor die, voids are produced at the junctions between x and y cutting lines (e.g. as shown in FIG. 6) prior to the wafer bonding processes. These voids may be conveniently formed using conventional glass machining techniques such as ultrasonic machining, wet etching or powder blasting. After wafer bonding, the various layers may be diced together using conventional cutting along the x and y axis without any alignment issues.

EXAMPLE

Devices of the type described in GB 2322196 have been fabricated by producing a wafer populated with magnetic assemblies 30 arranged in alternate die positions as shown in FIG. 5. Additional diagonal dicing was applied to the wafer to produce octagonal sensor dies, which were then assembled in standard can packages using conventional procedures, e.g. attached by means of a silicone elastomer adhesive layer. The only difference from the devices described in GB 2322196 was some relatively minor modifications which were required to alter the location of the metal tracking on the surface of the MEMS sensor. These octagonal devices were then tested to measure the variation of the quadrature bias with temperature to enable a direct comparison to be made with the performance of the conventional square chip devices. The resulting data, shown in FIG. 9, can be directly compared with the data shown in FIG. 2.

Figure 9:
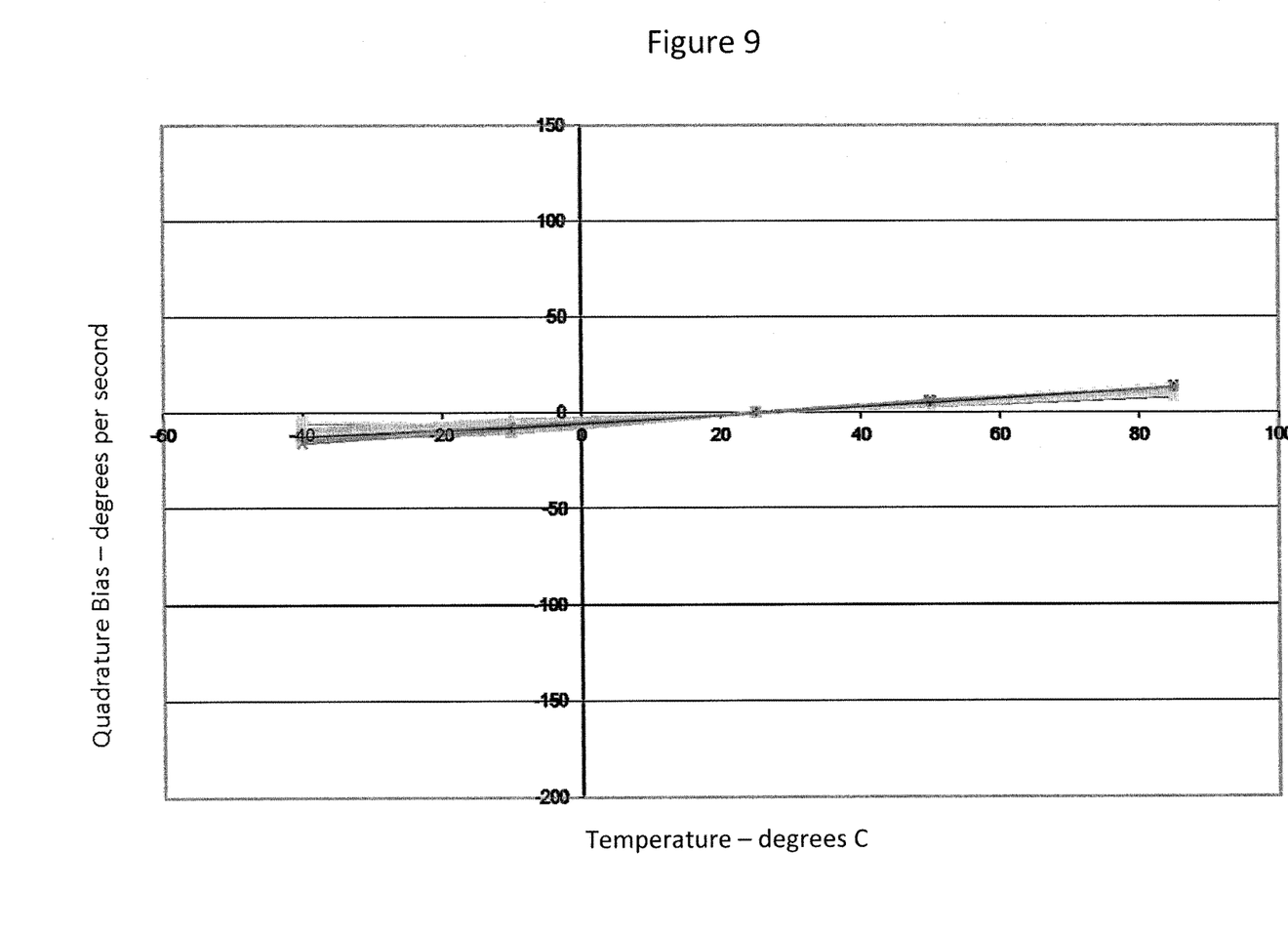
FIG. 9 shows the quadrature bias variation with temperature for a MEMS sensor made using an octagonal die.

FIG. 9 shows the quadrature bias variation as a function of temperature (normalised to 25° C. value). It has been demonstrated that the quadrature bias temperature variation is reduced by more than six times for the octagonal devices as compared to the rectangular devices. This clearly demonstrates the effectiveness of an octagonal sensor die in reducing the detrimental stiffness asymmetry resulting in a cos 4θ perturbation to the cos 2θ mode pair.

It will be understood that while the examples described above relate to a vibrating structure gyroscope, the disclosure is not limited to such devices and may be applied to any MEMS sensor device comprising a vibrating sensing structure, such as various types of inertial sensors and mass detection sensors.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:
1. A MEMS sensor comprising:
   a vibrating sensing structure formed from a semiconductor substrate layer, the semiconductor substrate layer being mounted on a pedestal comprising an electrically insulating substrate layer bonded to the semiconductor substrate to form a rectangular sensor chip; and the pedestal further comprising at least one electrically insulating spacer layer for mounting the sensor chip to a housing, wherein the electrically insulating spacer layer is octagonal;

wherein the sensor is a vibrating structure gyroscope and the vibrating sensing structure comprises: a substantially planar annular resonator; and a plurality of flexible support members arranged to support the annular resonator spaced from the semiconductor substrate and to allow the annular resonator to oscillate in one or more in-plane resonance modes.

2. The MEMS sensor of claim 1, wherein the octagonal spacer layer is thicker than the electrically insulating substrate layer that directly mounts the semiconductor substrate layer.

3. The MEMS sensor of claim 1, wherein the octagonal spacer layer is formed with voids before it is mounted to the electrically insulating substrate layer and the substrate layers are cut to form the pedestal.

4. The MEMS sensor of claim 1, wherein the octagonal spacer layer is formed separately and then mounted to the rectangular sensor chip.

5. The MEMS sensor of claim 1, wherein the octagonal spacer layer has an irregular octagonal shape.

6. The MEMS sensor of claim 1 comprising:

a sensing transducer to detect oscillation of the annular resonator resulting from an orthogonal secondary in-plane resonance mode generated in response to an angular velocity applied around an axis substantially perpendicular to the plane of the annular resonator.

7. A method of making the MEMS sensor of claim 1, the method comprising:

forming a vibrating sensing structure on a semiconductor substrate layer;

mounting the semiconductor substrate layer to an electrically insulating substrate layer so that rectangular sensor dies can be defined by orthogonal x and y cutting lines in the plane of the substrate layers;

mounting the electrically insulating substrate layer to a spacer layer that has voids formed at at least some junctions of the x and y cutting lines;

dicing the layers to form sensor dies comprising a rectangular sensor chip mounted on an octagonal spacer layer; and selecting one of the sensor dies and bonding the spacer layer to a housing to form the MEMS sensor of claim 1.

8. The method of claim 7, comprising: forming voids in the spacer layers at each junction of the x and y cutting lines; and dicing the layers along the x and y cutting lines to form sensor dies comprising a rectangular sensor chip mounted on the octagonal spacer layer.

9. The method of any of claim 7, wherein the octagonal spacer layer is thicker than an electrically insulating substrate layer that directly mounts the semiconductor substrate layer.

10. The method of any of claim 7, wherein the vibrating sensing structure is a substantially planar annular resonator for a vibrating structure gyroscope.

11. The MEMS sensor of claim 1, wherein the semiconductor substrate layer is formed of silicon.

12. The MEMS sensor of claim 1, wherein the electrically insulating substrate layer(s) is/are formed of glass.

* * * * *

UNITED STATES PATENT AND TRADEMARK OFFICE
CERTIFICATE OF CORRECTION

| | | |
|---|---|---|
| PATENT NO. | : 9,709,401 B2 | |
| APPLICATION NO. | : 14/266323 | |
| DATED | : July 18, 2017 | |
| INVENTOR(S) | : Chris Fell | |

It is certified that error appears in the above-identified patent and that said Letters Patent is hereby corrected as shown below:

In the Specification

Column 9, Line 65:
Delete "illustrate"
Insert -- illustrates --

Signed and Sealed this
Third Day of October, 2017

Joseph Matal
*Performing the Functions and Duties of the*
*Under Secretary of Commerce for Intellectual Property and*
*Director of the United States Patent and Trademark Office*